UNITED STATES PATENT OFFICE.

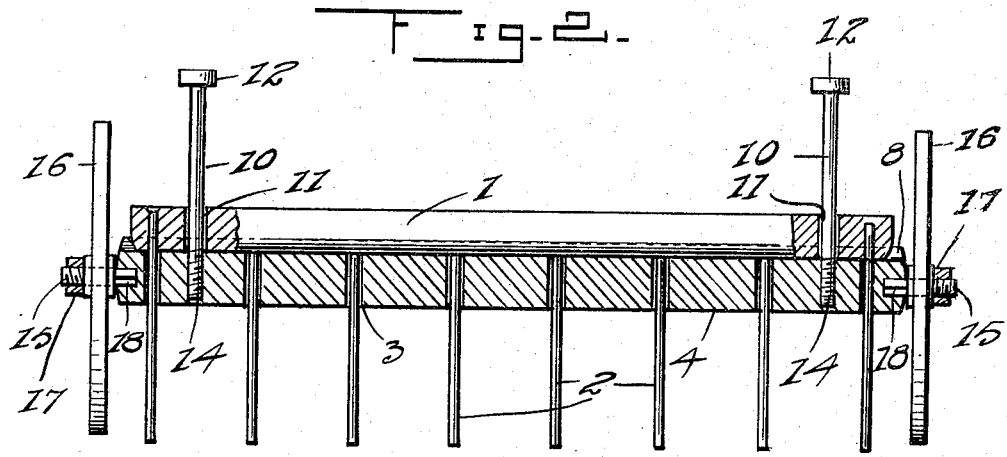
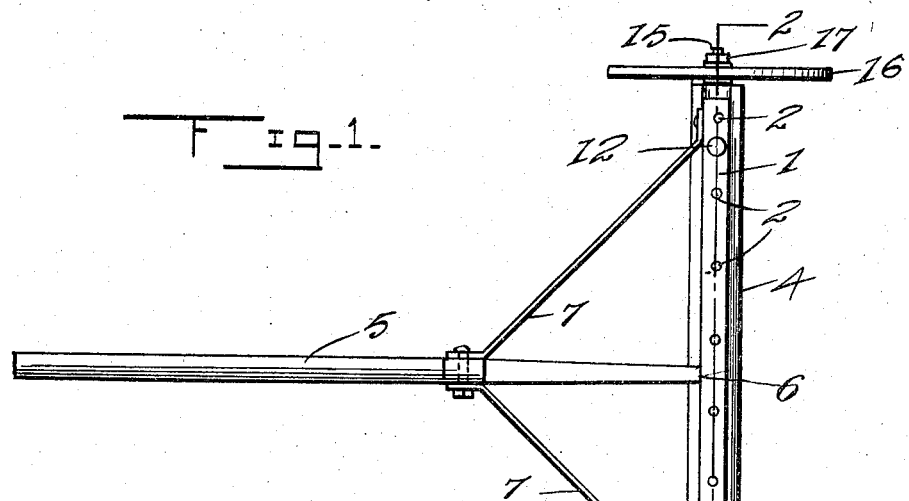
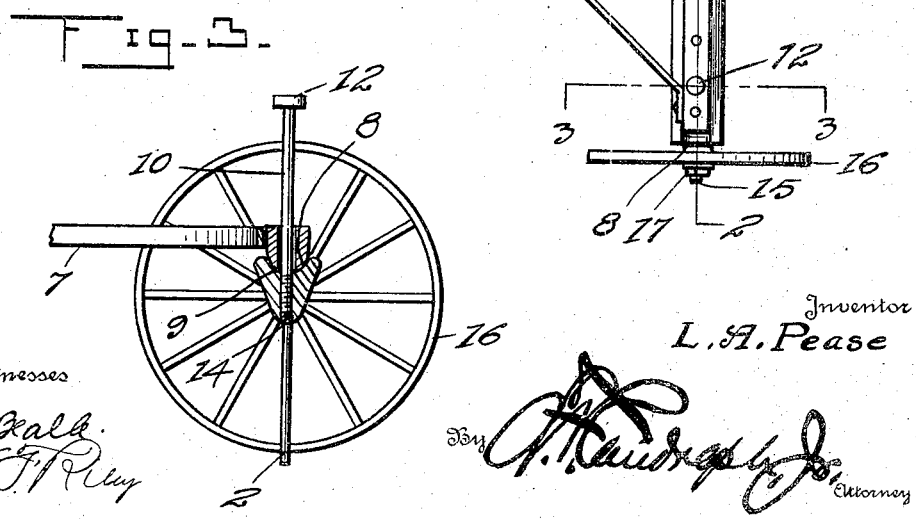

LYDIA A. PEASE, OF JAMESPORT, MISSOURI.

SELF-CLEANING RAKE.

1,191,610.

Specification of Letters Patent.   Patented July 18, 1916.

Application filed April 21, 1915.   Serial No. 22,862.

*To all whom it may concern:*

Be it known that I, LYDIA A. PEASE, a citizen of the United States, residing at Jamesport, in the county of Daviess and State of Missouri, have invented certain new and useful Improvements in Self-Cleaning Rakes; and I do hereby declare the following to be a full, clear, and exact description of the invention, such as will enable others skilled in the art to which it appertains to make and use the same.

The invention relates to a self-cleaning rake for gardens and lawns.

The object of the present invention is to improve the construction of self-cleaning rakes and to provide a simple, practical and comparatively inexpensive rake designed for use on lawns and gardens and equipped with wheels to enable it to be easily run over the surface to be raked and capable of automatically removing accumulation from the teeth when it is lifted from the ground and of similarly returning the parts to their initial position when placed on the ground.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawing Figure 1 is a plan view of a self-cleaning lawn and garden rake constructed in accordance with this invention, Fig. 2 is a transverse sectional view on the line 2—2 of Fig. 1, Fig. 3 is a longitudinal sectional view on the line 3—3 of Fig. 1.

Like numerals of reference designate corresponding parts in the several figures of the drawing.

In the accompanying drawing in which is illustrated the preferred embodiment of the invention, the self-cleaning rake comprises in its construction a rake head 1 provided with depending straight vertical teeth 2 passing through openings 3 in a cleaner bar or member 4. The rake head 1 is secured to the rear end of a handle 5 having its terminal portion fitted in a socket 6 of the rake head and retained therein by means of side braces 7. The braces 7 which converge forwardly from the rake head are bolted at their rear ends and similarly secured at their front ends to the handle at opposite sides thereof. The rake head is rounded at its lower face and cross sectionally tapered slightly to fit in a longitudinal groove 9 in the upper face of the cleaner bar or member 4. The rake head is slidably connected with the cleaner bar or member by means of vertical standards 10 consisting of rods extending through openings 11 in the end portions of the rake head and provided at their upper ends with heads 12. The lower ends of the rods or standards are threaded at 14 and are embedded in the cleaner bar or member which may be constructed of suitable material. The heads 12 of the rods form stops and limit the relative upward movement of the rake head and the relative downward movement of the cleaner bar or member which constitutes an axle body. The cleaner bar or member is provided at its ends with spindle 15 on which are secured wheels 16 by nuts 17 or other suitable means. The spindles 15 have shank portions 18 which are embedded in the ends of the cleaner bar or member but the spindles may be applied to the terminal portions of the said bar or member in any other desired manner. The nuts 17 engage threaded portions of the spindles and when the rake is lifted from the ground the weight of the wheels and the cleaner bar or member causes the latter to move downwardly and remove from the teeth any accumulation of grass, weeds, soil or the like and when the rake is again placed on the ground, the pressure causes the teeth to pass downwardly through the openings 3 and assume their normal position. The wheels enable the rake to be moved rapidly over the surface to be raked and the self-cleaning feature obviates the necessity of cleaning the rake teeth by hand.

What is claimed is:—

1. A self-cleaning rake of the class described including a cleaner bar provided with supporting wheels and having openings arranged at intervals, a rake head located above the cleaner bar, and provided with teeth extending through the openings, and rods mounted on the cleaner bar, and slidably receiving the rake heads limiting the relative movement of the rake head and cleaner bar, and said wheels adapted to move the cleaner bar downwardly when they are lifted clear of the ground and stripping said teeth substantially as described.

2. A self-cleaning rake of the class described including a cleaner bar tapered downwardly and provided in its upper face with a longitudinal groove, said cleaner bar being also provided with openings arranged at intervals; a rake head fitted in the groove of the cleaner bar and provided with teeth extending through said openings, said rake head being also provided with spaced openings, and standards mounted on the cleaner bar and extending through the openings of the rake head and provided with means for limiting the relative movement of said rake head and cleaner bar, wheels journaled on the opposite end of cleaner bar, and adapted to move the bar downwardly over the teeth when lifted clear of the ground cleaning the same substantially as described.

In testimony whereof I affix my signature in presence of two witnesses.

LYDIA A. PEASE.

Witnesses:
　JOHN L. PEASE,
　LENNIE A. PEASE.

Copies of this patent may be obtained for five cents each, by addressing the "Commissioner of Patents, Washington, D. C."